(12) United States Patent
Bronchain et al.

(10) Patent No.: US 12,362,931 B2
(45) Date of Patent: Jul. 15, 2025

(54) MASKED INFINITY NORM CHECK FOR CRYSTALS-DILITHIUM SIGNATURE GENERATION

(71) Applicant: NXP B.V., Eindhoven (NL)

(72) Inventors: Olivier Bronchain, Auderghem (BE); Joost Roland Renes, 's-Hertogenbosch (NL); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 154 days.

(21) Appl. No.: 18/320,028

(22) Filed: May 18, 2023

(65) Prior Publication Data

US 2024/0388433 A1  Nov. 21, 2024

(51) Int. Cl.
*H04L 9/30* (2006.01)

(52) U.S. Cl.
CPC .......... *H04L 9/3093* (2013.01); *H04L 9/3006* (2013.01)

(58) Field of Classification Search
CPC .................... H04L 9/3093; H04L 9/3006
See application file for complete search history.

(56) References Cited

U.S. PATENT DOCUMENTS

| | | | |
|---|---|---|---|
| 6,076,163 A * | 6/2000 | Hoffstein | H04L 9/3271 713/168 |
| 11,265,163 B2 | 3/2022 | Poeppelmann | |
| 11,416,638 B2 | 8/2022 | Banerjee | |
| 2011/0243320 A1 * | 10/2011 | Halevi | H04L 9/0861 380/30 |
| 2020/0153618 A1 * | 5/2020 | Bhattacharya | H04L 9/0841 |
| 2022/0012334 A1 * | 1/2022 | Ghosh | G06F 7/724 |
| 2023/0025869 A1 * | 1/2023 | Rao | G06F 21/602 |
| 2023/0030316 A1 * | 2/2023 | Pessl | G06F 21/75 |

(Continued)

FOREIGN PATENT DOCUMENTS

| | | |
|---|---|---|
| FR | 2926652 A1 | 7/2009 |
| KR | 102312379 B1 | 10/2021 |

(Continued)

OTHER PUBLICATIONS

Agence Nationale de la securite des systemes d'information (ANSSI), Anssi views on the post-quantum cryptography transition, https://www.ssi.gov.fr/en/publication/anssi-views-on-the-post-quantum-cryptography-transition/.

(Continued)

*Primary Examiner* — Lynn D Feild
*Assistant Examiner* — Abdullah Almamun

(57) ABSTRACT

A data processing system and method for norm checking a cryptographic operation for lattice-based cryptography in a processor, the instructions, including: multiplying a first polynomial by a second polynomial to produce a first output, wherein the d arithmetic shares have a modulus q'; securely converting the first output to d Boolean shares; securely subtracting a third polynomial from the first output to produce a second output, wherein the third polynomial is randomly generated and then offset by a first constant parameter; securely adding a first constant based upon a bound check and the first constant parameter to the second output to shift the values of the second output to positive values to produce a third output; and securely adding a second constant based upon the bound check to the third output to produce a carry bit.

20 Claims, 3 Drawing Sheets

(56) References Cited

U.S. PATENT DOCUMENTS

| | | | |
|---|---|---|---|
| 2023/0034127 A1* | 2/2023 | Park | H04L 9/3093 |
| 2023/0038135 A1* | 2/2023 | Gowanlock | H04L 9/3278 |
| 2023/0353361 A1 | 11/2023 | Schoenauer et al. | |
| 2024/0031140 A1* | 1/2024 | Basso | H04L 9/002 |
| 2024/0223354 A1* | 7/2024 | Azouaoui | H04L 9/3218 |
| 2024/0250831 A1* | 7/2024 | Matsui | G06F 8/65 |
| 2024/0305663 A1* | 9/2024 | Routt | H04L 63/1425 |

FOREIGN PATENT DOCUMENTS

| | | |
|---|---|---|
| KR | 102375031 B1 | 3/2022 |
| WO | 2021/240157 A1 | 5/2021 |

OTHER PUBLICATIONS

Melissa Azouaoui, Olivier Bronchain, Gaetan Cassiers, Clement Hoffmann, Yulia Kuzovkova, Joost Renes, Markus Schonauer, Tobias Schneider, Francois-Xavier Standaert, and Christine van Vredendaal, Leveling dilithium against leakage: Revisited sensitivity analysis and improved implementations, Cryptology ePrint Archive, Paper 2022/1406, 2022, https://eprint.iacr.org/2022/1406.

Gilles Barthe, Sonia Belaid, Thomas Espitau, Pierre-Alain Fouque, Benjamin Gregoire, Melissa Rossi, and Mehdi Tibouchi, Masking the GLP lattice-based signature scheme at any order, Eurocrypt (2), Lecture Notes in Computer Science, vol. 10821, Springer, 2018, pp. 354-384.

Joppe W. Bos, Joost Renes, and Daan Sprenkels, Dilithium for memory constraineddevices, IACR Cryptol. ePrint Arch. (2022), 323.

Olivier Bronchain and Gaetan Cassiers, Bitslicing arithmetic/boolean masking conversions for fun and profit with application to lattice-based kems, IACR Trans. Cryptogr. Hardw. Embed. Syst. 2022 (2022), No. 4, 553-588.

Bundesamt für Sicherheit in der Informationstechnik, Migration zu post-quanten-kryptografie, https://www.bsi.bund.de/SharedDocs/Downloads/DE/BSI/Krypto/Post-Quanten-Kryptografie.pdf; isessionid=4E25811453CDCA572EE4B949296E89EB.internet472?_blob=publicationFile&v=1.

Jean-Sebastien Coron, Francois Gerard, Simon Montoya, and Rina Zeitoun, High order polynomial comparison and masking lattice-based encryption, IACR Cryptol. ePrint Arch. (2021), 1615.

Francois Gerard and Melissa Rossi, an efficient and provable masked implementation of qtesla, Cardis, Lecture Notes in Computer Science, vol. 11833, Springer, 2019, pp. 74-91.

Denisa O. C. Greconici, Matthias J. Kannwischer, and Daan Sprenkels, Compact dilithium implementations on cortex-m3 and cortex-m4, IACR Trans. Cryptogr. Hardw. Embed. Syst. 2021 (2021), No. 1, 1-24.

Suparna Kundu, Jan-Pieter D'Anvers, Michiel Van Beirendonck, Angshuman Karmakar, and Ingrid Verbauwhede, Higher-order masked saber, Cryptology ePrint Archive, Paper 2022/389, 2022, https://eprint.iacr.org/2022/389.

Vincent Migliore, Benoît Gerard, Mehdi Tibouchi, and Pierre-Alain Fouque, Masking dilithium—efficient implementation and side-channel evaluation, ACNS, Lecture Notes in Computer Science, vol. 11464, Springer, 2019, pp. 344-362.

Hauke Steffen, Georg Land, Lucie Kogelheide, and Tim Güneysu, Breaking and protecting the crystal: Side-channel analysis of dilithium in hardware, Cryptology ePrint Archive, Paper 2022/1410, 2022, https://eprint.iacr.org/2022/1410.

U.S. Appl. No. 17/811,669, filed Jul. 11, 2022 entitled "Rejection of Masked Polynomials".

U.S. Appl. No. 17/835,898, filed Jun. 8, 2022 entitled "Protection Polynomial Rejection Through Masked Compressed Comparison".

U.S. Appl. No. 17/935,550; Inventors: Melissa Azouaoui, et al.; Title: "Protecting Polynomial Rejection Through Masked Compressed Comparison"; File Date: Sep. 26, 2022.

* cited by examiner

MASKED INFINITY NORM CHECK FOR CRYSTALS-DILITHIUM SIGNATURE GENERATION

FIELD OF THE DISCLOSURE

Various exemplary embodiments disclosed herein relate to masked infinity norm check for CRYSTALS-Dilithium signature generation.

BACKGROUND

In July 2022 NIST selected algorithms for the future standard for asymmetric cryptography which is safe against quantum computers. As a result, both CRYSTALS-Kyber for Key Encapsulation Mechanism (KEM) and CRYSTALS-Dilithium for digital signatures are about to be deployed in a wide range of applications. This transition is not only desired by the National Institute of Standards and Technology (NIST) (U.S.) but also by the French National Agency for the Security of Information Systems (ANSSI) (France) and Federal Office for Information Security (BSI) (Germany). These future quantum safe cryptography standards are based on lattices, which require more memory and more computational resources compared to pre-quantum existing solutions. Hence, their implementation into embedded systems is a well-known challenge as both memory and computational resources are limited. Additionally, these platforms are vulnerable to physical attacks such as side-channel attacks, for which the countermeasures consume both additional memory and computation power.

SUMMARY

A summary of various exemplary embodiments is presented below.

Various embodiments relate to a data processing system including instructions embodied in a non-transitory computer readable medium, the instructions for norm checking a cryptographic operation for lattice-based cryptography in a processor, the instructions, including: multiplying a first polynomial having d arithmetic shares by a second polynomial to produce a first output, wherein the d arithmetic shares have a modulus q'; securely converting the d arithmetic shares of the first output to d Boolean shares; securely subtracting a third polynomial with d Boolean shares from the Boolean first output to produce a second output with d Boolean shares, wherein the third polynomial is randomly generated and then offset by a first constant parameter; securely adding a first constant based upon a bound check and the first constant parameter to the second output to shift values of the second output to positive values to produce a third output with d Boolean shares; securely adding a second constant based upon the bound check to the third output to produce a carry bit with d Boolean shares; and carrying out a cryptographic operation when the carry bit indicates that the second output satisfies a norm check based upon the bound check.

Various embodiments are described, wherein q' is a power of two.

Various embodiments are described, wherein $\|\hat{c} \circ \hat{s}\|_\infty < q'$, where $\hat{c}$ is the first polynomial that is public and $\hat{s}$ is the second polynomial that is secret where $\|\cdot\|_\infty \leq q'$ means that the absolute value of each of the coefficients of the polynomial is less than or equal than q'.

Various embodiments are described, further including: secretly expanding coefficients of the Boolean shares of the third polynomial to k+1 bits by appending zeros, where k is a number of bits of the coefficients of the third polynomial; and secretly expanding coefficients of the Boolean shares of the first output to k+1 bits by appending zeros.

Various embodiments are described, wherein securely subtracting the third polynomial with d Boolean shares from the Boolean first output includes computing:

$$z'^{B,k+1} \leftarrow \text{SecSub}_{k+1}^d(sc^{B,k+1}, x^{B,k+1})$$

where $sc^{B,k+1}$ is the Boolean shares of the expanded first output, $x^{B,k+1}$ is the Boolean shares of the expanded third polynomial, $\text{SecSub}_{k+1}^d$ is a secure subtraction function, and $z'^{B,k+1}$ is the Boolean shares of a fourth output.

Various embodiments are described, wherein securely adding a first constant based upon a bound check and the first constant parameter to the second output includes computing:

$$z'^{B,k+1} \leftarrow \text{SecAdd}_{k+1}^d(z^{B,k+1}, \beta + \gamma)$$

where $\beta$ is the bound check, $\gamma$ is the first constant parameter, and $\text{SecAdd}_{k+1}^d$ is a secure addition function.

Various embodiments are described, wherein securely adding a second constant based upon the bound check to the third output includes computing:

$$b^{B,1} \leftarrow \text{SecAdd}_{k+2}^d(z'^{B,k+1}, 2^{k+2} - 2 \cdot \beta)[k+1]$$

where $b^{B,1}$ are the Boolean shares of the carry bit.

Various embodiments are described, further including securely unmasking the Boolean shares of the carry bit to produce the carry bit.

Various embodiments are described, wherein the d Boolean shares of the first output include k' bits, where $k' = \lceil \log_2 q' \rceil$.

Various embodiments are described, wherein coefficients of the third polynomial are unsigned such that $0 \leq x < 2^k$, where k is the number of bits of the coefficients of the third polynomial.

Further various embodiments relate to a method for norm checking a cryptographic operation for lattice-based cryptography, including: multiplying a first polynomial having d arithmetic shares by a second polynomial to produce a first output, wherein the d arithmetic shares have a modulus q'; securely converting the d arithmetic shares of the first output to d Boolean shares; securely subtracting a third polynomial with d Boolean shares from the Boolean first output to produce a second output with d Boolean shares, wherein the third polynomial is randomly generated and then offset by a first constant parameter; securely adding a first constant based upon a bound check and the first constant parameter to the second output to shift values of the second output to positive values to produce a third output with d Boolean shares; securely adding a second constant based upon the bound check to the third output to produce a carry bit with d Boolean shares; and carrying out a cryptographic operation when the carry bit indicates that the second output satisfies a norm check based upon the bound check.

Various embodiments are described, wherein q' is a power of two.

Various embodiments are described, wherein $\|\hat{c} \circ \hat{s}\|_\infty < q'$, where $\hat{c}$ is the first polynomial that is public and $\hat{s}$ is the second polynomial that is secret where $\|\cdot\|_\infty \leq q'$ means that the absolute value of each of the coefficients of the polynomial is less than or equal than $q'$.

Various embodiments are described, further including: secretly expanding coefficients of the Boolean shares of the third polynomial to k+1 bits by appending zeros, where k is a number of bits of the coefficients of the third polynomial; and secretly expanding coefficients of the Boolean shares of the first output to k+1 bits by appending zeros.

Various embodiments are described, wherein securely subtracting the third polynomial with d Boolean shares from the Boolean first output includes computing:

$$z'^{B,k+1} \leftarrow \text{SecSub}_{k+1}^d(sc^{B,k+1}, x^{B,k+1})$$

where $sc^{B,k+1}$ is the Boolean shares of the expanded first output, $x^{B,k+1}$ is the Boolean shares of the expanded third polynomial, $\text{SecSub}_{k+1}{}^d$ is a secure subtraction function, and $z'^{B,k+1}$ is the Boolean shares of a fourth output.

Various embodiments are described, wherein securely adding a first constant based upon a bound check and the first constant parameter to the second output includes computing:

$$z'^{B,k+1} \leftarrow \text{SecAdd}_{k+1}^d(z^{B,k+1}, \beta + \gamma)$$

where $\beta$ is the bound check, $\gamma$ is the first constant parameter, and $\text{SecAdd}_{k+1}{}^d$ is a secure addition function.

Various embodiments are described, wherein securely adding a second constant based upon the bound check to the third output includes computing:

$$b^{B,1} \leftarrow \text{SecAdd}_{k+2}^d(z'^{B,k+1}, 2^{k+2} - 2 \cdot \beta)[k+1]$$

where $b^{B,1}$ are the Boolean shares of the carry bit.

Various embodiments are described, further including securely unmasking the Boolean shares of the carry bit to produce the carry bit.

Various embodiments are described, wherein the d Boolean shares of the first output include k' bits, where $k' = \lceil \log_2 q' \rceil$.

Various embodiments are described, wherein coefficients of the third polynomial are unsigned such that $0 \leq x < 2^k$, where k is the number of bits of the coefficients of the third polynomial.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
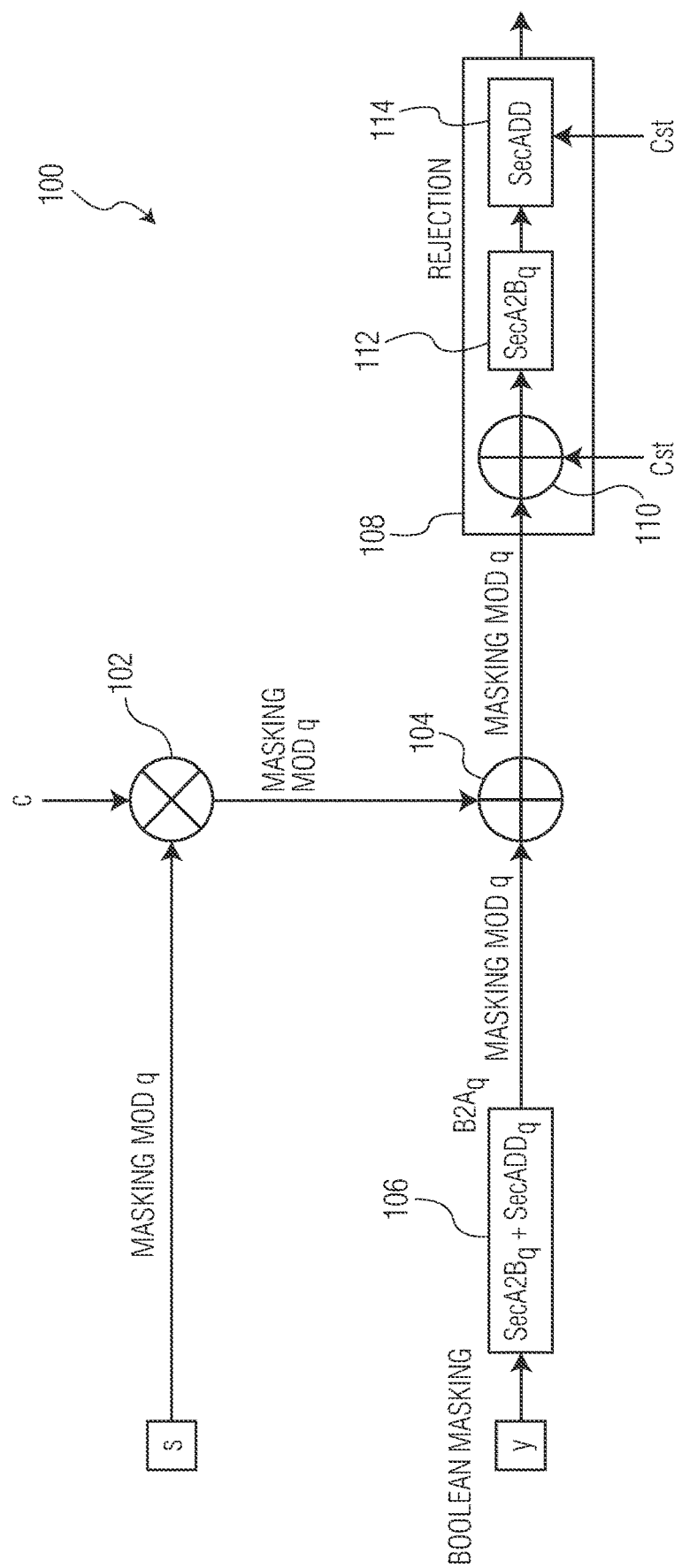
FIG. 1 illustrates the current state of the art for computing the rejection function.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of post quantum cryptography systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

In July 2022 NIST selected algorithms for the future standard for asymmetric cryptography which is safe against quantum computers. As a result, both CRYSTALS-Kyber for Key Encapsulation Mechanism (KEM) and CRYSTALS-Dilithium for digital signatures are about to be deployed in a wide range of applications. This transition is not only desired by the National Institute of Standards and Technology (NIST) (U.S.) but also by the French National Agency for the Security of Information Systems (ANSSI) (France) and Federal Office for Information Security (BSI) (Germany). These future quantum safe cryptography standards are based on lattices, which require more memory and more computational resources compared to pre-quantum existing solutions. Hence, their implementation into embedded systems is a well-known challenge as both memory and computational resources are limited. Additionally, these platforms are vulnerable to physical attacks such as side-channel attacks, for which the countermeasures consume both additional memory and computation power. Hence, implementing efficient countermeasures that are both fast and memory efficient is an open challenge. Such solutions have been already extensively studied for CRYSTALS-Kyber, but only limited studies have been carried out for CRYSTALS-Dilithium. In these limited studies, their goal is to improve the run time but no memory efficient solutions have been studied when side-channels are a concern.

The protection against side-channel attacks is usually achieved using masking countermeasures that have been extensively studied. Despite being theoretically sound and practically relevant, masking comes with significant challenges when applied in the context of lattice-based cryptography as the execution time increases quadratically (for non-linear operations) with respect to the security parameter (number of shares) and the memory consumption usage increases linearly. Additionally, it requires a combination of different types of masking (arithmetic and Boolean) and conversion algorithms are generally the bottleneck of masked implementation of lattice-based cryptography. In this disclosure, the focus is on the signature generation of a side-channel hardened CRYSTALS-Dilithium implementation. More precisely, the multiplication between a secret polynomial and a public polynomial is targeted, followed by an addition with another secret polynomial and a (infinity) norm check. These operations are of arithmetic nature and therefore generally done in arithmetic masking domain, with additional conversions between Boolean and arithmetic masking. These operations have significant impact on the overall performances of CRYSTALS-Dilithium ($\approx$30%) and optimizing these operations is crucial to enable deployment of the future digital signature standard in a wide range of applications.

In this disclosure, another approach is taken where most of the (arithmetic) operations are performed with Boolean masking, leading to improvements in run-time and in memory. The reduction in memory is obtained thanks to a careful choice of the arithmetic masking modulus as well as the use of bitsliced representation for secret data. This design choice is possible because the secret key is of small norm (with coefficients [−2,2] or [−4,4]) and is multiplied with a public sparse polynomial of small norm (with coefficients in {−1,0,1}). As a result, a smaller modulus for the arithmetic masks may be used (and possibly a power of two) compared to the state-of-art that uses the CRYSTALS-Dilithium modulus q. This may be applied because no reduction with CRYSTALS-Dilithium modulus can occur. The gain in speed is obtained by removing the need for most of the masking conversions and from the fact that operations may be performed with a smaller (power of two) modulus. This approach is applicable to both software and hardware implementations of side-channel hardened CRYSTALS-Dilithium.

Masking allows for the protection of an intermediate variable x against side-channel attack by enforcing an implementation to replace manipulations on x by manipulations on d shares. Each share of x is uniformly distributed such that any combination of d−1 shares is independent of x. The embodiments described herein make use of two ways to split the sensitive variable, namely arithmetic masking and Boolean masking.

With arithmetic masking, a variable $x \in \mathbb{Z}_p$ is protected for an arbitrary modulus p. The ensemble of d shares of x as the arithmetic sharing is denoted as $x^{A_p} \in \mathbb{Z}_p^d$. The i-th share is denoted as $x_i^{A_p} \in \mathbb{Z}_p$ for all $0 \leq i < d$. The relation between the shares and x are given such that the sum of all the shares over $\mathbb{Z}_p$ is x as follows:

$$x = \sum_{i=0}^{d-1} x_i^{A_p} \bmod p.$$

It is noted that computing in a protected manner z=x+y mod p with a public constant $y \in \mathbb{Z}_p$, a sharing $x^{A_p}$ and an output sharing $z^{A_p}$ can simply be computed. Indeed, the addition with y can be applied only to a single share in $x^{A_p}$ because $$z = \sum_{i=0}^{d-1} z_i^{A_p} = x_0^{A_p} + y + \sum_{i=0}^{d-1} x_i^{A_p} = y + \sum_{i=0}^{d-1} x_i^{A_p} = y + x.$$

Similar to arithmetic masking, Boolean masking enables for the protection of a k-bit variable x. The ensemble of the d shares of x as the Boolean sharing is denoted as $x^{B,k}$ and the i-th share is denoted as $x_i^{B,k}$. The sharing of the j-th bit of x is denoted as $x^{B,k}[j]$. The relation between x and its shares is given as:

$$x = \bigoplus_{i=0}^{d-1} x_1^{B,k},$$

where $\oplus$ denotes a bitwise exclusive OR.

In this disclosure, masked polynomials for which all the coefficients are either masked with Boolean masking or arithmetic masking are used. A polynomial is designated with a hat such as ĉ. As a result, a polynomial masked with arithmetic masking is denoted as $\hat{c}^{A_p}$, and similarly for Boolean masking denoted as $\hat{c}^{B,k}$. The polynomial multiplication is denoted with ∘. Unless mentioned otherwise, when an algorithm takes as input a polynomial, it is applied coefficientwise.

In this disclosure, both types of masking are leveraged. Hence, masking conversions algorithms will be used. The first conversion algorithm enables the conversion from arithmetic masking with p modulus to Boolean masking and is denoted as $\text{SecA2BMod}_p^d$. The second conversion algorithm enables the conversion of Boolean sharing to an arithmetic sharing. This algorithm is denoted as $\text{SecB2AMod}_p^d$. When $p=2^k$, these algorithms may be denoted as $\text{SecA2B}_k^d$ and $\text{SecB2A}_k^d$ respectively. These power of two variants generally offer better performance than the variant for arbitrary p. For a concrete instantiation of these algorithms see Olivier Bronchain and Gaetan Cassiers, *Bitslicing arithmetic/boolean masking conversions for fun and profit with application to lattice-based kems*, IACR Trans. Cryptogr. Hardw. Embed. Syst. 2022 (2022), no. 4, 553-588, which is hereby incorporated for all purposes as if included herein.

Embodiments disclosed herein include performing additions between variables for which each bit is protected with Boolean masking. It is noted that these embodiments are independent of then specific implementations of the addition and conversion algorithms. It will not be described how to add such variables. The main building block is a secure full adder introduced and recalled in an exemplary Algorithm 1 below from Bronchain and Cassiers. It takes as input three bits $x^{B,1}$, $y^{B,1}$ and $z^{B,1}$ and returns two bits $w^{B,2}$ representing their addition. An addition on k bits, denoted as $SecAdd_k^d$, can be built by chaining such SecFullAdder's as described Algorithm 2.

---
Algorithm 1 - SecFullAdder$^d$
---

Input: Boolean sharing $x^{B,1}$, $y^{B,1}$ and $z^{B,1}$.
Output: Boolean sharing $w^{B,2}$ such that $w = x + y + z$.
1: $a^{B,1} \leftarrow x^{B,1} \oplus^B y^{B,1}$
2: $w^{B,2}[0] \leftarrow z^{B,1} \oplus^B a^{B,1}$
3: $w^{B,2}[1] \leftarrow x^{B,1} \oplus^B SecAnd_1^d(a^{B,1}, x^{B,1} \oplus^B z^{B,1})$  ▷PINI SecAnd ---
Algorithm 2 - SecAdd$_k^d$
---

Input: Boolean sharing $x^{B,k}$ and $y^{B,k}$, such that $x, y \in [\![0, 2^k[\![$.
Output: Boolean sharing $z^{B,k}$ such that $z = x + y \bmod 2^k$.
1: $c^{B,1} \leftarrow (0,0, ... ,0)$
2: for $i = 0$ to $k - 2$ do
3:   $t^{B,2} \leftarrow SecFullAdder^d(x^{B,k}[i], y^{B,k}[i], c^{B,1})$  ▷Algorithm 1
4:   $(z^{B,k}[i], c^{B,1}) \leftarrow (t^{B,2}[0], t^{B,2}[1])$
5: $z^{B,k}[k-1] \leftarrow x^{B,k}[k-1] \oplus^B y^{B,k}[k-1] \oplus^B c^{B,1}$ Similarly, for the purpose of this disclosure, a new algorithm $SecSub_k^d$ is introduced that is a modification of $SecAdd_k^d$ in order to perform subtraction between two k bits words (see Algorithm 3). To do so, it exploits the fact that in the two's complement representation of number, the property $-y = \neg y + 1$ holds. Hence, $SecSub_k^d$ applies exactly $SecAdd_k^d$ by negating all the bits of y and taking 1 as carry in.

---
Algorithm 3 - SecSub$_k^d$
---

Input: Boolean sharing $x^{B,k}$ and $y^{B,k}$, such that $x, y \in [\![0, 2^k[\![$.
Output: Boolean sharing $z^{B,k}$ such that $z = x - y \bmod 2^k$.
1: $c^{B,1} \leftarrow (1,0, ... ,0)$
2: for $i = 0$ to $k - 2$ do
3:   $t^{B,2} \leftarrow SecFullAdder^d(x^{B,K}[i], \neg y^{B,k}[i], c^{B,1})$  ▷Algorithm 1
4:   $(z^{B,k}[i], c^{B,1}) \leftarrow (t^{B,2}[0], t^{B,2}[1])$
5: $z^{B,k}[k-1] \leftarrow x^{B,k}[k-1] \oplus^B \neg y^{B,k}[k-1] \oplus^B c^{B,1}$ The goal of the embodiments described herein is to compute in an efficient and side-channel manner the rejection function $$\|\hat{y} + \hat{c} \circ \hat{s}\|_\infty \leq \beta,$$

where $\|\cdot\|_\infty \leq \beta$ is the standard notation which means that the absolute value of each of the coefficients of the polynomial is less than or equal than $\beta$. In the context of embedded system with strong memory constraints, the $\hat{y}$ will typically be regenerated with a Pseudo-random number generator (PRNG) function (e.g., SHAKE), and hence is protected with Boolean masking as illustrated in FIG. 1 based on the current state of the art. FIG. 1 illustrates the current state of the art for computing the rejection function. The long-term secret polynomial $\hat{s}$ is a polynomial of small norm. $\hat{s}$ is secured using arithmetic masking with modulus q. The expression $\hat{c} \circ \hat{s}$ is calculated using multiplier 102. The polynomial $\hat{y}$ is Boolean masked and is converted to an arithmetic masking with a modulus of q using $BSecB2AModp_q$ function 106. The $BSecB2AModp_q$ function 106 may implemented using the $SecA2Bmodp_q$ function and the $SecADDModp_q$ function. The arithmetic shares of $\hat{y}$ are then added to the output of the multiplier 102 using adder 104. The output of the adder 104 is the input into the rejection module 108 that compares the input to $\beta$ per the rejection function shown above. The rejection module 108 includes adder 110, $SecA2BModp_q$ function 112, and SecAdd 114 function. The rejection module 108 receives a constant value Cst. Overall, the operation count is as follows. One $SecB2AModp_q$ must be applied to $\hat{y}$ which costs approximately one $SecAddModp_q$ as well as one $SecA2BModp_q$. Then, the polynomial addition and multiplication comes almost for free when both polynomials are protected with arithmetic masking. Finally, the rejection is performed with a constant addition on arithmetic masking (hence almost free), a $SecA2BModp_q$ and one SecAdd. So overall, this requires two $SecA2BModp_q$, one $SecAddModp_q$ and one SecAdd.

Figure 2:
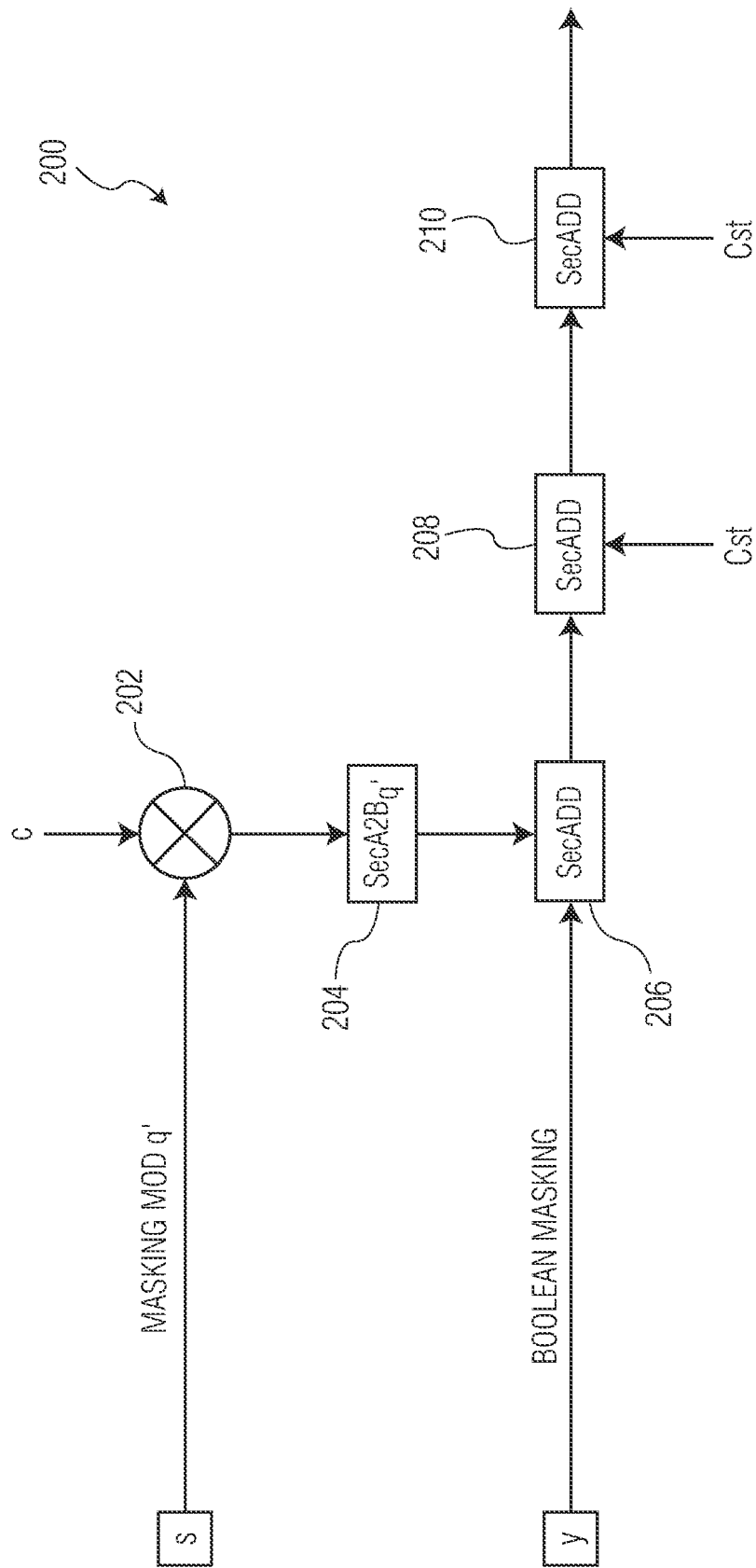
FIG. 2 illustrates an embodiment of a secure rejection system that implements a secure rejection method.

FIG. 2 illustrates an embodiment of a secure rejection system that implements a secure rejection method. In the following description, the number of precision bits required for the masked additions SecAdd are omitted. Refer to Algorithm 4 and 5 for such a detail. Multiplier 202 multiplies $\hat{c}$ and $\hat{s}$, and the output of the multiplier 202 is converted into Boolean shares using a $SecA2BModp_{q'}$ function 204. The output of the $SecA2BModp_{q'}$ function 204 is securely added to the Boolean shares of $\hat{y}$ using the $SecAdd_{2^k}$ function 206. The SecAdd function 206 output is then added to Cst using a SecAdd function 208, and its output is added to Cst using the SecAdd function 210. The output of the SecAdd function 210 indicates whether the secure computation is accepted or rejected. The secure rejection system 200 may be implemented using hardware, software carrying out instructions on a processor, or a combination thereof. The specific elements of the secure rejection system 200 may be implemented using hardware, software carrying out instructions on a processor, or a combination thereof.

The main change implemented in the secure rejection system 200 compared to the rejection method 100 of FIG. 1 is that $\hat{y}$ is no longer converted from Boolean to arithmetic masking, and hence the addition of $\hat{y}$ and $\hat{c} \circ \hat{s}$ is performed with a Boolean addition 206. This addition may be performed with a SecAdd instead of a $SecAddModp_q$ because the norm of both operands implies that no reduction will occur. Because this addition will be performed on Boolean sharing, it offers additional degrees of freedom when selecting the masking modulus q' used to secure the multiplication $\hat{c} \circ \hat{s}$. There the only constraint is that one must ensure that $\|\hat{c} \circ \hat{s}\|_\infty < q'$, hence q' can be selected to be relatively small compared to q for all the CRYSTALS-Dilithium parameter sets. More precisely, q' can either be: a small prime to implement the polynomial multiplication with the use of NTTs; or a small power of two to implement the cheaper $SecA2B_{2^k}$ instead of $SecA2BModp_q$. Finally, the rejection is performed with two additional SecAdd's. Putting all of the computations together, three SecAdd's are required as well as one single $SecA2BModp_{q'}$.

Because one $SecAddModp_q$ is implemented with three serial SecAdd's, the new secure rejection method is clearly advantageous regarding the execution time. Indeed, it saves two $SecA2BModp_q$'s and one SecAdd at the cost of an additional $SecA2BModp_{q'}$.

The second advantage of the secure rejection system 200 is with respect to memory consumption. Indeed, when masked modulo q', the secret-key coefficients only require $\log_2 q'$ bits of storage instead of $\log_2 q$ bits when masked modulo q. Moreover, all the additions with ŷ may be performed in a bitsliced manner that only consumes the exact number of bits in memory independent of q and processor word size. It is noted that when ŷ is stored in arithmetic masking with modulus q (which is the case of $\hat{w}_0$ in CRYSTALS-Dilithium), the secure rejection system 200 still improves over the state-of-the-art rejection method 100 because it costs only an extra SecA2BModp$_q$.

It is also noted that extra memory may be saved by storing the polynomial ŝ with Boolean masking in order to fit exactly its bit size. In this case, a SecB2AModp$_{q'}$ is required before performing the polynomial multiplication. As a result, selecting a q' that minimizes the cost of masking conversions is crucial. Hence, selecting q' as a power of two is the favorable option.

An embodiment of a secure rejection method will now be described for the specific case of ŷ being protected with Boolean masking as detailed in Algorithm 4 (SecGenZ) and Algorithm 5 (SecSubAndCheck). In order to be compliant with the CRYSTALS-Dilithium specification, a parameter γ is introduced such that the algorithm takes as input a Boolean sharing of $x^{B,k}$ such that y=γ−x.

The first step in SecGenZ at line 1 is to perform the polynomial multiplication $\hat{s}^{Aq'} \circ \hat{c}$ using arithmetic shares. It is noted that in arithmetic masking, the multiplication with ĉ is linear with respect to the masking and can be applied independently on all the shares in $\hat{s}^{Aq'}$. Then at line 2, the output of the multiplication is converted to Boolean masking. Note that ŝc is usually represented with mod$^±$ (so coefficients modulo q' are in [0, q'−1]) and that the sign of the coefficient must be taken into account for the subsequent addition. If q' is a power of two, then the resulting Boolean representation will be the two's complement signed representation of the coefficient. If q' is not a power of two, an addition with −q'/2 can be included with γ, and all coefficients may be negated trivially with arithmetic masking.

---

Algorithm 4 - SecGenZ$_k^d$(ŝ$^A_{q'}$, ĉ, x̂$^{B,k}$, γ, β)

---

Input: Masked input polynomials ŝ and x̂, public polynomial ĉ and public integer parameters γ, β, k and q' such that k' = [log$_2$ q'].
Coefficients in x̂ are unsigned such that $0 \le x < 2^k$.
Output: Returns b = 1 iff $\|\hat{s} \circ \hat{c} + (\gamma - \hat{x})\|_\infty \le \beta$, b = 0 otherwise.
1: ŝĉ$^{Aq'}$ ← ŝ$^{Aq'}$ ∘ ĉ    ▷ Perform the polynomial multiplication share-wise.
2: ŝĉ$^{B,k'}$ ← SecA2BModp$_{q'}^d$(ŝĉ$^{Aq'}$)
3: return SecSubAndCheck$_{k+1}^d$(x̂$^{B,k}$, ŝĉ$^{B,k'}$, γ, β)

---

The next step in SecGenZ is to add the Boolean sharing with varying number of bits and signedness. Before doing so, ŝĉ is first converted from arithmetic to Boolean masking in line 2. The addition must be performed on integers without reduction. To do so the two first lines of Algorithm 5 SecSubAndCheck$_k^d$(x$^{B,k}$, sc$^{B,k'}$, γ, β) expand the Boolean representation of x and ŝĉ in order to obtain their two's complement signed representation on k+1 bits. It is noted that k+1 bits are needed because we do not want implicit modular reduction to occur. This mapping is done in an unsigned way for (with SecExpandUnsigned) by padding the necessary bits with zeros because all its coefficients are positive. This is done in a signed manner for ŝĉ (with SecExpandSigned), hence the MSB is repeated. Then, the actual addition is performed with SecSub for the two polynomials at line 3. The two following additions at lines 4 and 5 are required in order to check the bounds. First, the accepted range is mapped to only positives. Then, a subtraction is performed at line 5. The resulting carry bit indicates if the result is negative. In such a case, the resulting z is accepted and b=1 is returned.

---

Algorithm 5 - SecSubAndCheck$_k^d$(x$^{B,k}$, sc$^{B,k'}$, γ, β)

---

Input: Boolean x$^{B,k}$ and sc$^{B,k'}$, such that x mod $2^k$ and sc mod $2^{k'}$ with k ≥ k'.
Output: Returns b = 1 iff $\|sc + (\gamma - x)\|_\infty \le \beta$, b = 0 otherwise.
1: x$^{B,k+1}$ ← SecExpandUnsigned$_{k,k+1}^d$(x$^{B,k}$)    ▷ Expand x to k + 1-bits by appending zeros
2: sc$^{B,k+1}$ ← SecExpandSigned$_{k',k+1}^d$(sc$^{B,k'}$) ▷ Expand sc to k + 1-bits by repeating the MSB.
3: z$^{B,k+1}$ ← SecSub$_{k+1}^d$(sc$^{B,k+1}$, x$^{B,k+1}$)    ▷ b = 1 iif −β − γ ≤ z ≤ β − γ mod$^±2^{k+1}$
4: z$^{B,k+1}$ ← SecAdd$_{k+1}^d$(z$^{B,k+1}$, β + γ)    ▷ b = 1 iif 0 ≤ z ≤ 2 · β mod $2^{k+1}$
5: b$^{B,1}$ ← SecAdd$_{k+2}^d$(z$^{B,k+1}$, $2^{k+2}$ − 2 · β)[k + 1]
6: return b ← SecUnMask$_1^d$(b$^{B,1}$)

---

Figure 3:
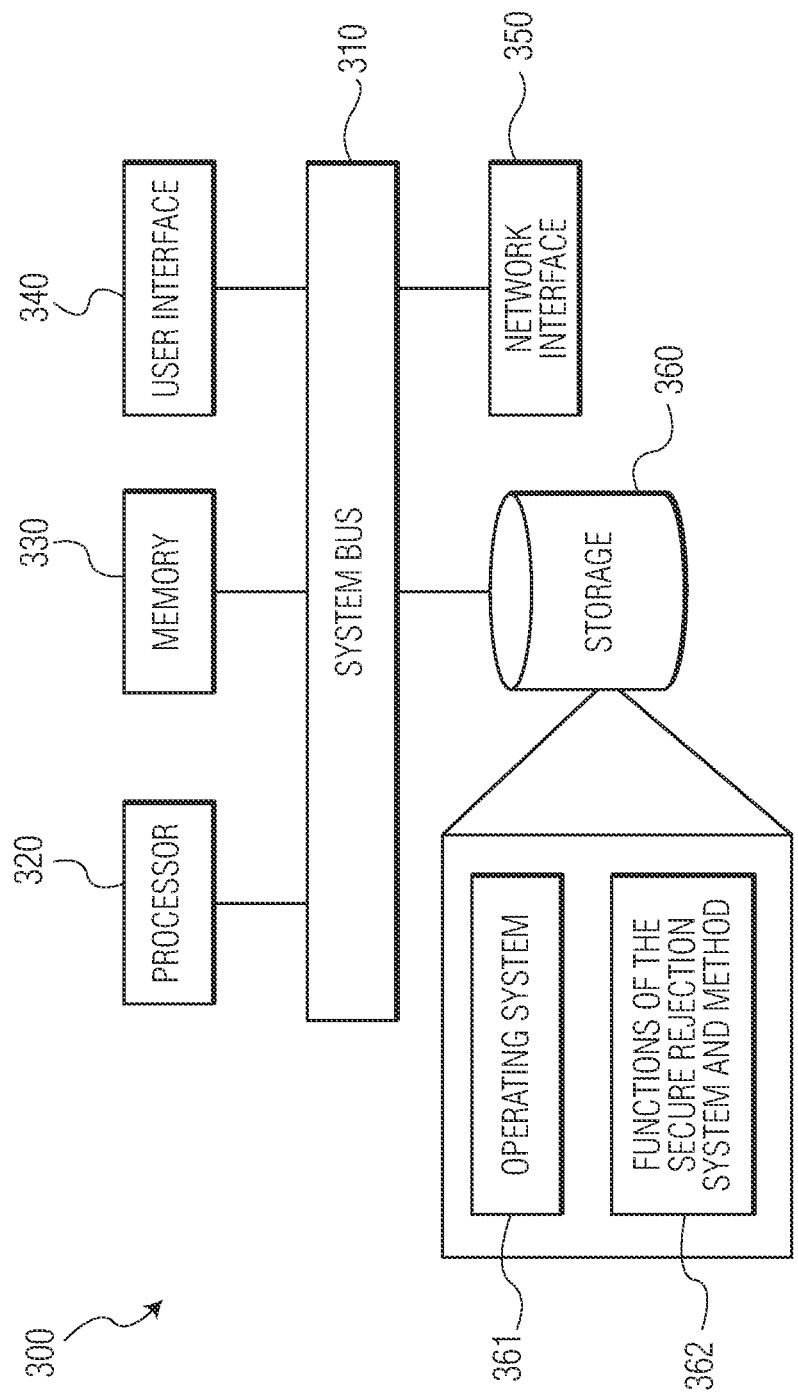
FIG. 3 illustrates an exemplary hardware diagram for implementing secure rejection system and method in a cryptographic system.

FIG. 3 illustrates an exemplary hardware diagram 300 for implementing secure rejection system and method in a cryptographic system. The exemplary hardware 300 may be the secure rejection system 200 in FIG. 2 or specific elements of the secure rejection system 200. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 340 may include one or more devices for enabling communication with a user such as an administrator. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 360 may include instructions to carry out the functions of the secure rejection system and method 362.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A data processing system comprising instructions embodied in a non-transitory computer readable medium, the instructions for norm checking a cryptographic operation for lattice-based cryptography in a processor, the instructions comprising processor-readable instructions that, when executed, cause a processor to:
   determine data to be digitally signed;
   begin digitally signing the determined data using a crystals-Dilithium signature generation process;
   multiply a first polynomial having d arithmetic shares by a second polynomial to produce a first output, wherein the d arithmetic shares have a modulus q';

securely convert the d arithmetic shares of the first output to d Boolean shares;

securely subtract a third polynomial with d Boolean shares from the first output to produce a second output with d Boolean shares, wherein the third polynomial is randomly generated and then offset by a first constant parameter;

securely add a first constant based upon a bound check and the first constant parameter to the second output to shift values of the second output to positive values to produce a third output with d Boolean shares;

securely add a second constant based upon the bound check to the third output to produce a carry bit with d Boolean shares; and continue digitally signing the determined data when the carry bit indicates that the second output satisfies a norm check based upon the bound check.

2. The data processing system of claim 1, wherein q' is a power of two.

3. The data processing system of claim 1, wherein $\|\hat{c} \circ \hat{s}\|_\infty < q'$, where $\hat{c}$ is the first polynomial that is public and $\hat{s}$ is the second polynomial that is secret where $\|\cdot\|_\infty \leq q'$ means that the absolute value of each of the coefficients of the polynomial is less than or equal than q'.

4. The data processing system of claim 1, wherein the processor-readable instructions further cause the processor to:

secretly expand coefficients of the Boolean shares of the third polynomial to k+1 bits by appending zeros, where k is a number of bits of the coefficients of the third polynomial; and secretly expand coefficients of the d Boolean shares of the first output to k+1 bits by appending zeros.

5. The data processing system of claim 4, wherein the processor-readable instructions causing the processor to securely subtract the third polynomial with d Boolean shares from the first output include instructions that cause the processor to compute:

$$z'^{B,k+1} \leftarrow \text{SecSub}_{k+1}^d(sc^{B,k+1}, x^{B,k+1})$$

where $sc^{B,k+1}$ is the Boolean shares of the expanded first output, $x^{B,k+1}$ is the Boolean shares of the is the expanded third polynomial, $\text{SecSub}_{k+1}^d$ is a secure subtraction function, and $z'^{B,k+1}$ is the Boolean shares of a fourth output.

6. The data processing system of claim 5, wherein the processor-readable instructions causing the processor to securely add the first constant based upon the bound check and the first constant parameter to the second output include instructions that cause the processor to compute:

$$z'^{B,k+1} \leftarrow \text{SecAdd}_{k+1}^d(z^{B,k+1}, \beta + \gamma)$$

where $\beta$ is the bound check, $\gamma$ is the first constant parameter, and $\text{SecAdd}_{k+1}^d$ is a secure addition function.

7. The data processing system of claim 6, wherein the processor-readable instructions causing the processor to securely add the second constant based upon the bound check to the third output include instructions that cause the processor to compute:

$$b^{B,1} \leftarrow \text{SecAdd}_{k+2}^d(z'^{B,k+1}, 2^{k+2} - 2 \cdot \beta)[k+1]$$

where $b^{B,1}$ are the d Boolean shares of the carry bit.

8. The data processing system of claim 1, wherein the processor-readable instructions further comprise instructions that, when executed, cause the processor to securely unmask the d Boolean shares of the carry bit to produce the carry bit.

9. The data processing system of claim 1, wherein the d Boolean shares of the first output include k' bits, where $k' = \lceil \log_2 q' \rceil$.

10. The data processing system of claim 1, wherein coefficients of the third polynomial are unsigned such that $0 \leq x < 2^k$, where k is the number of bits of the coefficients of the third polynomial.

11. A method for norm checking a cryptographic operation for lattice-based cryptography, the method comprising:

determining, by a processor of a computing device, data to be digitally signed;

beginning digitally signing, by the processor, the determined data using a crystals-Dilithium signature generation process;

multiplying, by a processor of a computing device, a first polynomial having d arithmetic shares by a second polynomial to produce a first output, wherein the d arithmetic shares have a modulus q';

securely converting, by the processor, the d arithmetic shares of the first output to d Boolean shares;

securely subtracting, by the processor, a third polynomial with d Boolean shares from the first output to produce a second output with d Boolean shares, wherein the third polynomial is randomly generated and then offset by a first constant parameter;

securely adding, by the processor, a first constant based upon a bound check and the first constant parameter to the second output to shift values of the second output to positive values to produce a third output with d Boolean shares;

securely adding, by the processor, a second constant based upon the bound check to the third output to produce a carry bit with d Boolean shares; and continuing digitally signing the determined data, by the processor, when the carry bit indicates that the second output satisfies a norm check based upon the bound check.

12. The method of claim 11, wherein q' is a power of two.

13. The method of claim 11, wherein $\|\hat{c} \circ \hat{s}\|_\infty < q'$, where $\hat{c}$ is the first polynomial that is public and $\hat{s}$ is the second polynomial that is secret where $\|\cdot\|_\infty \leq q'$ means that the absolute value of each of the coefficients of the polynomial is less than or equal than q'.

14. The method of claim 11, further comprising:

secretly expand, by the processor, coefficients of the Boolean shares of the third polynomial to k+1 bits by appending zeros, where k is a number of bits of the coefficients of the third polynomial; and secretly expand, by the processor, coefficients of the Boolean shares of the first output to k+1 bits by appending zeros.

15. The method of claim 14, wherein securely subtract the third polynomial with d Boolean shares from the first output includes computing:

$$z'^{B,k+1} \leftarrow \mathrm{SecSub}_{k+1}^{d}(sc^{B,k+1}, x^{B,k+1})$$

where $sc^{B,k+1}$ is the Boolean shares of the expanded first output, $x^{B,k+1}$ is the Boolean shares of the expanded third polynomial, $\mathrm{SecSub}_{k+1}^{d}$ is a secure subtraction function, and $z'^{B,k+1}$ is the Boolean shares of a fourth output.

16. The method of claim 15, wherein securely adding a first constant based upon a bound check and the first constant parameter to the second output includes computing:

$$z'^{B,k+1} \leftarrow \mathrm{SecAdd}_{k+1}^{d}(z^{B,k+1}, \beta + \gamma)$$

where $\beta$ is the bound check, $\gamma$ is the first constant parameter, and $\mathrm{SecAdd}_{k+1}^{d}$ is a secure addition function.

17. The method of claim 16, wherein securely adding a second constant based upon the bound check to the third output includes computing:

$$b^{B,1} \leftarrow \mathrm{SecAdd}_{k+2}^{d}(z'^{B,k+1}, 2^{k+2} - 2 \cdot \beta)[k+1]$$

where $b^{B,1}$ are the d Boolean shares of the carry bit.

18. The method of claim 11, further comprising securely unmasking, by the processor, the d Boolean shares of the carry bit to produce the carry bit.

19. The method of claim 11, wherein the d Boolean shares of the first output include k' bits, where $k' = \lceil \log_2 q' \rceil$.

20. The method of claim 11, wherein coefficients of the third polynomial are unsigned such that $0 \leq x < 2^k$, where k is the number of bits of the coefficients of the third polynomial.

\* \* \* \* \*